(12) United States Patent
Xiong et al.

(10) Patent No.: US 11,662,159 B2
(45) Date of Patent: May 30, 2023

(54) DEVICE FOR ASSEMBLING AND PROCESSING PLATE HEAT EXCHANGER OF POWER BATTERY

(71) Applicant: Zhejiang University, Zhejiang (CN)

(72) Inventors: Shusheng Xiong, Zhejiang (CN); Qiujie Song, Zhejiang (CN); Wei Li, Zhejiang (CN); Jun Ye, Zhejiang (CN); Peng Li, Zhejiang (CN); You Weng, Zhejiang (CN)

(73) Assignee: Zhejiang University, Hangzhou (CN)

( * ) Notice: Subject to any disclaimer, the term of this patent is extended or adjusted under 35 U.S.C. 154(b) by 318 days.

(21) Appl. No.: 17/215,876

(22) Filed: Mar. 29, 2021

(65) Prior Publication Data

US 2021/0215441 A1    Jul. 15, 2021

(30) Foreign Application Priority Data

Mar. 30, 2020   (CN) .......................... 202010236046.9

(51) Int. Cl.
| | |
|---|---|
| *F28F 3/10* | (2006.01) |
| *F28F 3/08* | (2006.01) |
| *F28G 15/02* | (2006.01) |
| *B08B 3/02* | (2006.01) |
| *H01M 10/6567* | (2014.01) |

(52) U.S. Cl.
CPC .................. *F28F 3/10* (2013.01); *B08B 3/02* (2013.01); *F28F 3/086* (2013.01); *F28G 15/02* (2013.01); *H01M 10/6567* (2015.04)

(58) Field of Classification Search
CPC ............. F28D 9/005; F28D 2021/0029; F28D 2021/0043; F28D 2021/008
See application file for complete search history.

(56) References Cited

U.S. PATENT DOCUMENTS

| | | | |
|---|---|---|---|
| 2013/0042894 A1* | 2/2013 | Gromes, Sr. ............ | F28G 1/163 134/22.12 |
| 2014/0238643 A1* | 8/2014 | Hains ........................ | F28G 9/00 165/95 |
| 2018/0180365 A1* | 6/2018 | Jackson ................... | F28G 1/12 |

OTHER PUBLICATIONS

CN 201322565Y translation Plate-type heat exchanger (Year: 2009).*

* cited by examiner

*Primary Examiner* — Cristi J Tate-Sims

(57) ABSTRACT

The disclosure provides a device for assembling and processing a plate heat exchanger of a power battery, including a cleaning box, and a base platform. The base platform is welded to a bottom of the cleaning box. A water outlet pipe is welded symmetrically through an inside of the base platform obliquely. A power box is provided at a middle of the inside of the base platform. A motor is screwedly provided inside the power box. A top end of a rotating shaft of the motor is penetratingly welded to a bottom end of a rotating plate, and a welding position between the rotating shaft and the rotating plate is sealed. An edge of an upper surface of the rotating plate is welded to a bottom end of a connecting column, and a top end of the connecting column is penetratingly welded to an upper plate.

7 Claims, 5 Drawing Sheets

DEVICE FOR ASSEMBLING AND PROCESSING PLATE HEAT EXCHANGER OF POWER BATTERY

CROSS-REFERENCE TO RELATED APPLICATIONS

This application claims the benefit of priority from Chinese Patent Application No. 202010236046.9, filed on Mar. 30, 2020. The content of the aforementioned application, including any intervening amendments thereto, is incorporated herein by reference in its entirety.

TECHNICAL FIELD

The present application relates to power batteries, and more particularly to a device for assembling and processing a plate heat exchanger of a power battery.

BACKGROUND

In the latest national standards in China, automobiles refer to non-track-carrying vehicles driven by power and having four or more wheels, which are mainly applied to the transportation of people or goods. The automobiles have experienced a long development process. As early as 1680, the famous British scientist Newton envisioned a jet car plan, which adopts nozzles to inject steam to propel the car, but this idea has not been embodied in the practical application. Until 1769, the Frenchman N•J•Cugnot produced a three-wheeled automobile which was driven by steam generated from the gas burning, but the velocity of the automobile was only 4 km/h, and it had to stop for coal feeding every fifteen minutes, leading to troublesome operations. In 1879, Germany Engineer Carl Benz successfully invented a two-stroke experimental engine for the first time. In October of 1883, he founded the "Benz Company and Rhein Gas Engine Factory". In 1885, he made the first patented motor vehicle of Bentz in Mannheim, where the vehicle was a three-wheeled vehicle using a two-stroke single-cylinder 0.9 horsepower gasoline engine, and contained some basic features of modern vehicles, such as spark ignition, cooling cycle, steel frame, rear-wheel drive, front wheel steering and brake handles. In 1885, gasoline engines were manufactured, which brought a great improvement in the driving velocity of the vehicle.

In modern society, automobiles have become a common means of transportation, and gradually become more diversified. At present, in order to respond to the national call for energy conservation, emission reduction and environmental protection, new energy automobiles have been designed and manufactured, and have been appreciated by more and more consumers. The driving source of the new energy vehicles is a power battery, which is equipped with a heat exchange structure during operation to realize the temperature conversion, meeting requirements of the automobile for heating and cooling. However, the existing tubular heat exchange structure has low heat exchange efficiency. By contrast, the plate heat exchanger has high heat exchange efficiency and small space occupation, and thus has been gradually favored by the manufacture and customer. The plate heat exchanger is a high-efficiency heat exchanger formed by stacking of a series of metal sheets with a certain corrugated shape, in which a thin rectangular channel is formed between individual plate sheets, and the heat exchange is achieved through the plate sheets. The plate heat exchanger is an ideal device for liquid-liquid and liquid-vapor heat exchange. However, the plate heat exchanger needs to be cleaned manually during the assembly to ensure the heat exchange efficiency in the subsequent operation. Unfortunately, the existing assembling and processing devices of the plate heat exchanger still require manual cleaning, which leads to troublesome overturning operation and large labor consumption, reducing the cleaning efficiency.

SUMMARY

An object of the present disclosure is to provide a plate heat exchanger of a power battery and a device for assembling and processing the same. The assembling and processing device provided herein has multiple functions, which can not only clean the gas or liquid at the outlet and the inlet, but also optimize the crystallinity of the gas or liquid to reduce the occurrence of fouling inside the device. In addition, a cleaning structure is set up to improve the cleaning efficiency, and the internal water flow and the outer rotating structure are cooperated to provide a multi-angle and all-round washing effect, thereby improving the cleaning efficiency and promoting the subsequent mounting.

To achieve the above object, the technical solutions of the present disclosure are described as follows.

The present disclosure provides the plate heat exchanger of the power battery comprises a rear support plate; both ends of a side of the rear support plate is respectively welded to a guide rod; a retention groove is welded to a surface of the guide rod; an outer surface of the retention groove is welded on a surface of a plurality of heat exchange plates by a groove; a clamping plate is provided at a front end surface of the heat exchange plates at a front end; a side surface of the clamping plate is connected to a side surface of the rear support plate through a clamping stud to achieve a penetration mounting; two cold-side ports and two hot-side ports are respectively arranged on a side of the clamping plate; a rubber sealing lining is respectively arranged on an inner circumference of the two cold-side ports and the two hot-side ports; at least seven bolts are screwedly provided around a periphery of the two clod-side ports and the two hot-side ports; a surface edge of each of the plurality of heat exchange plates is recessed with a side groove; a plurality of openings are provided on a surface of each of plurality of heat exchange plates in correspondence to the cold-side ports and the hot-side ports; the number of the plurality of openings is the same with the total number of the cold-side ports and the hot-side ports; a ring gasket is fitted on a periphery of each of the plurality of openings; a gasket groove is provided at a surface of each of the plurality of heat exchange plates at the periphery of each of the plurality of openings; a mounting groove is provided on one side of the gasket groove connecting to the plurality of openings; an exchange surface is pressed on the surface of the plurality of heat exchange plates on one side of the mounting groove; a diversion arc is provided on the surface of the plurality of heat exchange plates at one side of the exchange surface; the two cold-side ports and the two hot-side ports respectively have a protruding surface; and a negative ion generator is respectively embedded on the protruding surface of the two cold-side ports and the two hot-side ports;

the two hot-side ports are symmetrically distributed on the same side; a radius of each of the two hot-side ports is consistent with a radius of each of the two cold-side ports; the negative ion generator is a direct-current micro negative ion generator, and electrically controlled by the power battery; the negative ion generator is powered by the power battery to generate negative ions; the plurality of heat exchange plates comprise A type heat exchange plates and B type heat exchange plates; the A type heat exchange plates and the B type heat exchange plates are alternately distributed; the number of the plurality of heat exchange plates is determined according to actual requirements; the plurality of heat exchange plates are fixed by welding; the exchange surface of each of the A type heat exchange plates and the exchange surface of each of the B type heat exchange plates are in mirrored distribution; and the diversion arc of each of the A type heat exchange plates and the diversion arc of each of the B type heat exchange plates are in a mirrored distribution.

The present disclosure further provides a device for assembling and processing a plate heat exchanger of a power battery, comprising:

a cleaning box; and a base platform;

wherein the base platform is welded to a bottom of the cleaning box; a water outlet pipe is welded symmetrically through an inside of the base platform obliquely; a power box is provided at a middle of the inside of the base platform; a motor is screwedly provided inside the power box; a top end of a rotating shaft of the motor is penetratingly welded to a bottom end of a rotating plate, and a welding position between the rotating shaft and the rotating plate is sealed; an edge of an upper surface of the rotating plate is welded to a bottom end of a connecting column; a top end of the connecting column is penetratingly welded to a lower surface of an upper plate; an upper surface of the cleaning box above the upper plate is provided with a collection port, and the collection port penetrates the upper surface of the cleaning box; a water spray pipe is arranged at a bottom end of the collection port and penetrates the upper plate; an inner circumference of the rotating plate is provided with a gusset area; a buckle protrusion is provided on an upper surface of the gusset area; a welding plane is provided on the upper surface of the gusset area for fixing the connecting column; a lower surface of the upper plate is provided with a corresponding plate; a water leakage hole is penetratingly arranged at an upper surface of the upper plate; a corresponding buckle block is protrudingly provided on the lower surface of the corresponding plate; a water diversion head is arranged at an inner circumference of the collection port; and a bottom end of the water diversion head is arranged at a top of a water distribution pipe.

In some embodiments, the cleaning box has a barrel-shaped structure made of stainless steel; a surface of the cleaning box is provided with an arc-shaped acrylic sealed door with a handle structure through a hinge structure; a sealing rubber is pasted at a mounting position of a door seam of the cleaning box; the base platform has a cylindrical structure made of stainless steel; a radius of the base platform is equal to a radius of the cleaning box; the inside of the base platform is an open structure except that an upper end of the power box has a closed structure; a circular threaded through hole is provided at an outer side wall of the base platform; the water outlet pipe is a seamless steel pipe, and a top end of the water outlet pipe is welded to an outer surface of a top end of the power box; a bottom end of the water outlet pipe is welded to an opening on the outer side wall of the base platform; and an outlet of the base platform is threadedly connected to a plastic water stop valve to control discharge of water inside the cleaning box.

In some embodiments, the power box has a rectangular structure made of stainless steel; an inner wall of the power box is bonded with an insulating rubber; a circular threading hole sealed with a rubber sealing ring is provided on a rear side wall of the power box; an opening-closing door is arranged on a front surface of the power box through a hinge for maintenance; the motor is a YE3 type motor, and the motor is connected to a three-wire plug through a wire to connect to an external control power for power supply; the top end of the rotating shaft of the motor penetrates an upper surface of the power box to achieve transmission; the rotating plate is made of round plastic; a surface of the rotating plate is provided with a circular threaded hole; a slope structure is provided at 0.3-0.5 cm within an edge of the rotating plate; and the rotating plate and the upper plate have the same circular structure and are symmetrically distributed.

In some embodiments, the gusset area has a polygonal structure made of stainless steel; the number of sides of the gusset area is equal to or more than twenty; a "U"-shaped plastic buckle protrusion is adhered to a surface of each side of the gusset area; a rectangular groove is provided on a surface of the buckle protrusion and penetrates through the buckle protrusion; a soft silica gel with a thickness of 2-3 mm is adhered to an inner surface of the rectangular groove; the number of buckle protrusions is two less than the number of sides of the gusset area, and each surface of the two sides of the gusset area without the buckle protrusion is the welding plane; the buckle protrusion is adhered at an angle of 20 degrees; the corresponding plate adopts the same structure as the gusset area; the number of sides of the corresponding plate is consistent with the number of sides of the gusset area; a center of the corresponding plate and a center of the gusset area are on the same horizontal line; the corresponding buckle block is arranged in the same structure as the buckle protrusion; a linear length of the corresponding buckle block is greater than a linear length of the buckle protrusion; the corresponding buckle block is distributed obliquely at an angle of 20 degrees; the corresponding buckle block and the buckle protrusion are inclined in different directions; and the corresponding buckle block and the buckle protrusion are staggered in a vertical direction.

In some embodiments, the collection port has a tubular structure; the water diversion head has a tubular structure made of polypropylene; the water diversion head is threadedly fixed on an upper end surface of the cleaning box; the water diversion head is configured to connect to an external water pipe for water supply; the water distribution pipe has a tubular structure at the upper end and a branch structure at the bottom end, and is made of polypropylene; the water distribution pipe has at least ten branch pipes; a center of the bottom end of the water distribution pipe is protrudedly provided with a central branch pipe for connecting the water spray pipe; the water leakage hole is provided on a surface of the upper plate; and the water leakage hole is configured to transmit a water flow of branch pipes of the water distribution pipe for flushing.

In some embodiments, the water spray pipe has a tubular structure made of stainless steel; a plurality of openings are unevenly provided at a surface of the water spray pipe; a radius of the plurality of openings is not greater than 0.5 mm; a distance between a bottom end of the water spray pipe and an upper surface of the rotating plate is 1-1.5 cm; the connecting column is made of stainless steel; a linear radius of the connecting column is not greater than 1 cm; and the connecting column is vertically welded to the welding plane.

Compared to the prior art, the present invention has the following beneficial effects.

(1) In the device for assembling and processing the plate heat exchanger of the power battery provided in the present disclosure, a cleaning box is provided for overall cleaning, and a structure is provided to realize a stable working processing. The device is picked up manually, and performs cleaning by a machine, thereby providing a use experience with less labor input and high work efficiency for users.

(2) In the device for assembling and processing the plate heat exchanger of the power battery provided in the present disclosure, a buckle structure is provided for overall active embedding, and a plurality of water distribution tube are provided for transmission, thereby realizing a diversified cleaning. In the device, the internal pressure of the water flow is relatively high, the water column cleaning power is strong, and the pressure of the external water column is small, forming a flushing state. Therefore, the device improves the cleaning efficiency.

Figure 1:
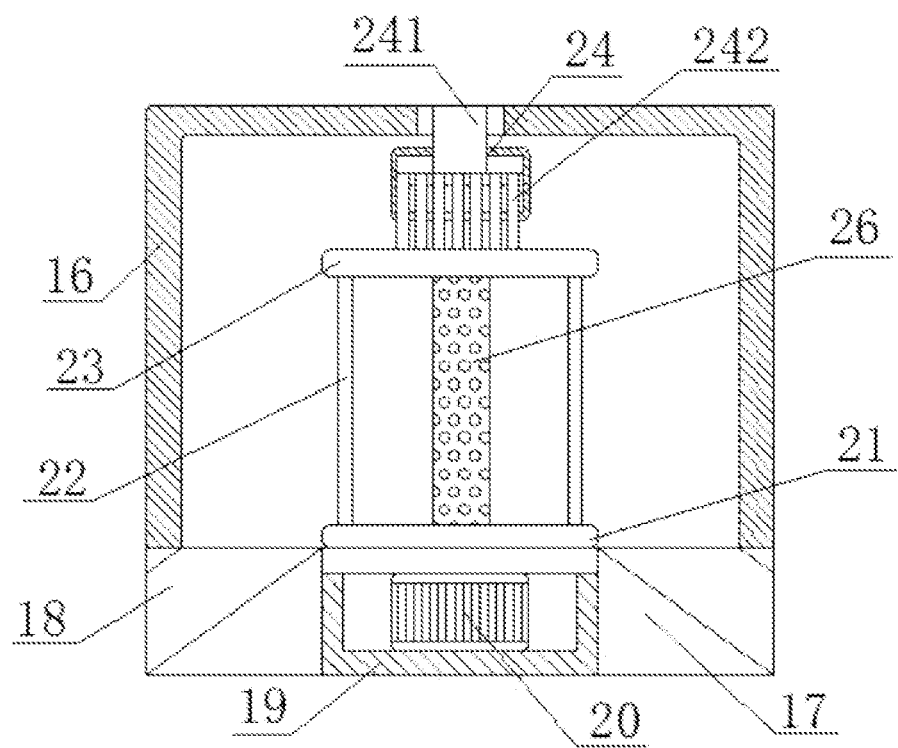
FIG. 1 is a schematic diagram of a device for assembling and processing a plate heat exchanger of a power battery according to an embodiment of the present disclosure.
Figure 2:
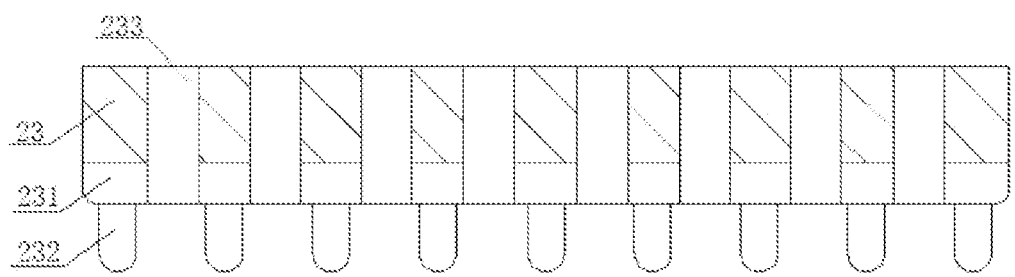
FIG. 2 is a schematic diagram of an upper plate according to an embodiment of the present disclosure.
Figure 3:
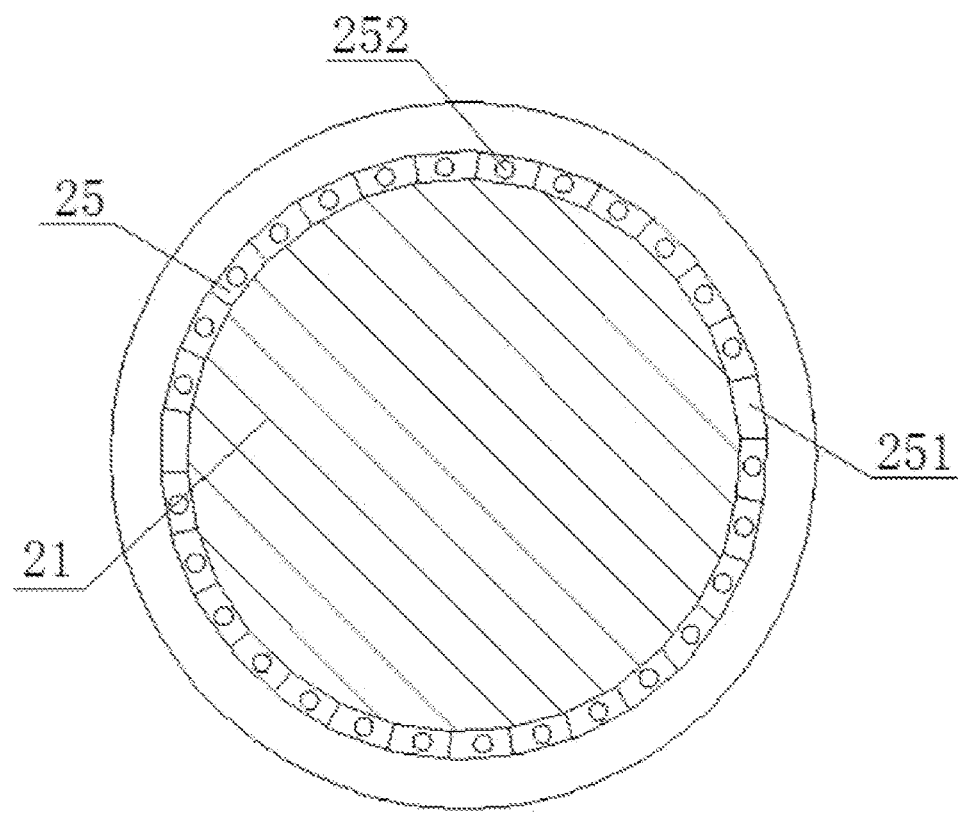
FIG. 3 is a schematic diagram of a gusset area according to an embodiment of the present disclosure.
Figure 4:
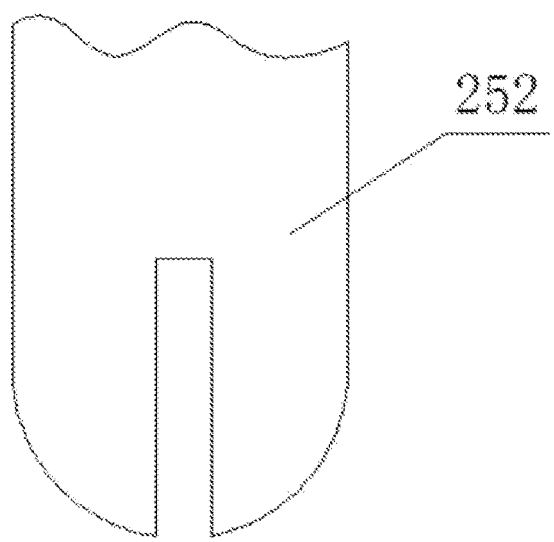
FIG. 4 is a schematic diagram of a buckle protrusion in FIG. 3 according to an embodiment of the present disclosure.
Figure 5:
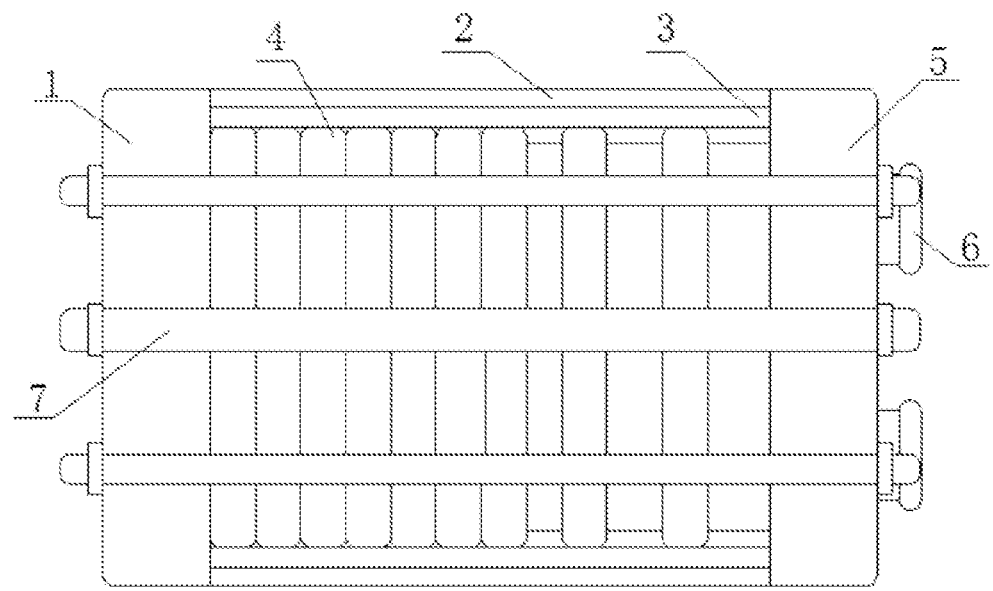
FIG. 5 is a schematic diagram of the plate heat exchanger of the power battery according to an embodiment of the present disclosure.
Figure 6:
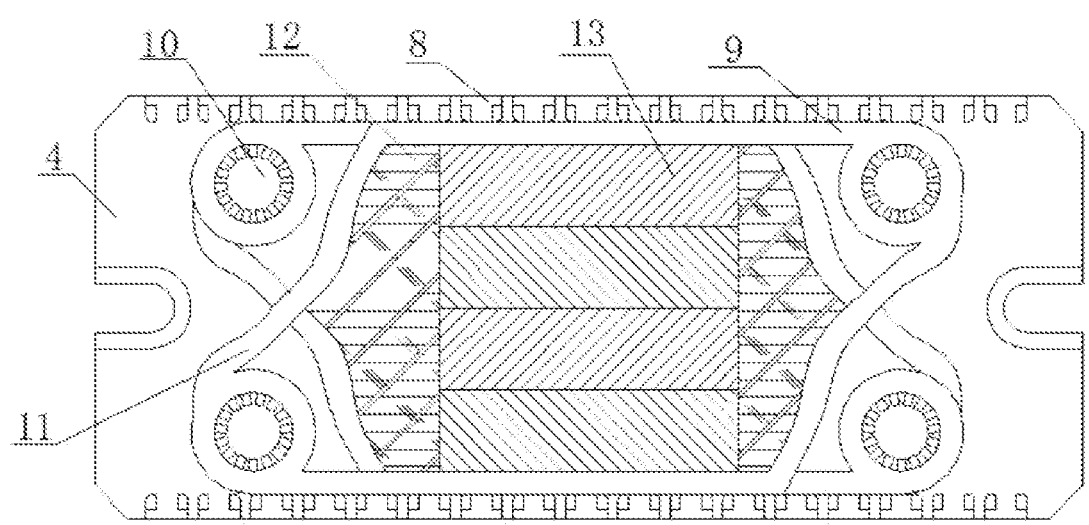
FIG. 6 is a schematic diagram of a surface of a plurality of heat exchange plates according to an embodiment of the present disclosure.
Figure 7:
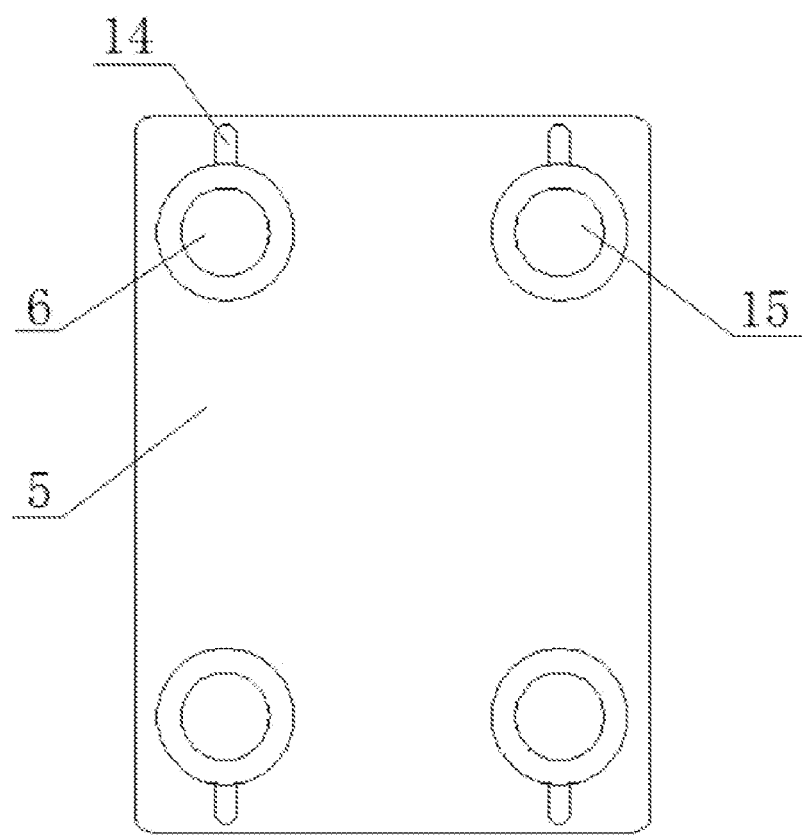
FIG. 7 is a schematic diagram of an outer surface of a clamping plate according to an embodiment of the present disclosure.
Figure 8:
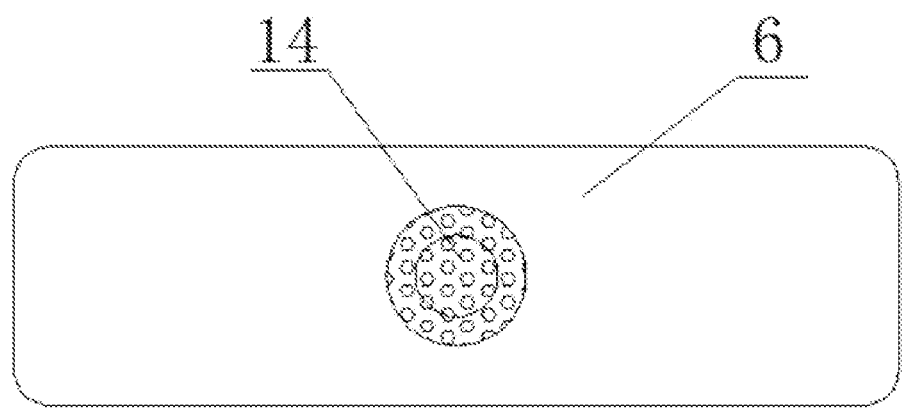
FIG. 8 is a schematic diagram of an inner surface of a negative ion generator according to an embodiment of the present disclosure.
Figure 9A:
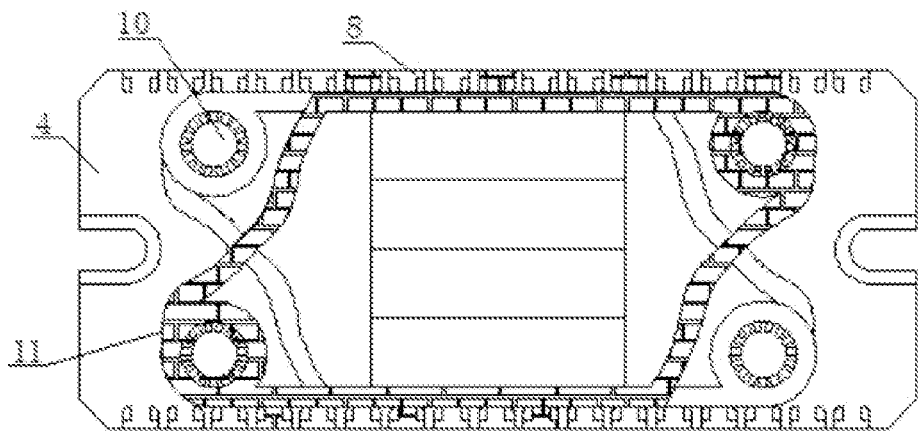
FIG. 9A-B show mounting states of the plurality of heat exchange plates according to an embodiment of the present disclosure, where 9A: A type heat exchange plate; and 9B: B type heat exchange plate.
Figure 9B:
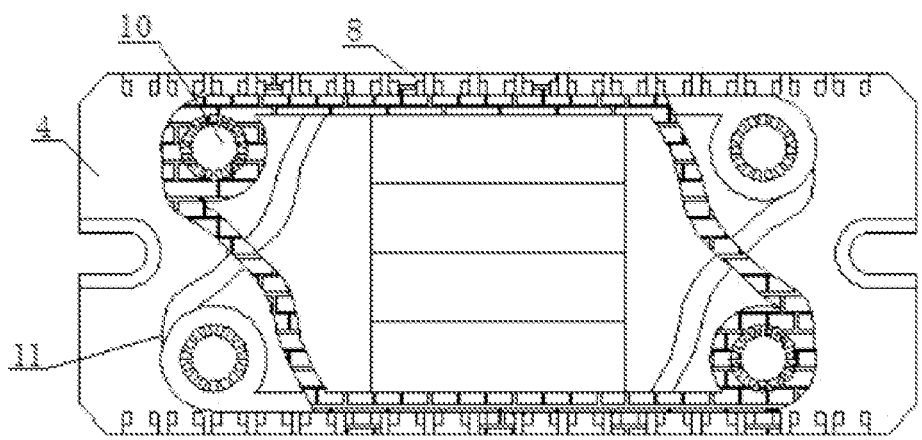

In the drawings: 1, rear support plate; 2, guide rod; 3, retention groove; 4, heat exchange plate; 5, clamping plate; 6, cold-side port; 7, clamping stud; 8, side groove; 9, gasket groove; 10, opening; 11, mounting groove; 12, exchange surface; 13, diversion arc; 14, negative ion generator; 15, hot-side port; 16, cleaning box; 17, base platform; 18, water outlet pipe; 19, power box; 20, motor; 21, rotating plate; 22, connecting column; 23, upper plate; 231, corresponding plate; 232, corresponding buckle block; 233, leaking hole; 24, collection port; 241, water diversion head; 242, water distribution pipe; 25, gusset area; 251, welding plane; 252, buckle protrusion; and 26, spray pipe.

DETAILED DESCRIPTION OF EMBODIMENTS

The technical solutions in the embodiments of the present disclosure will be clearly and completely described below in conjunction with the accompanying drawings of the present disclosure.

Provided is a plate heat exchanger of a power battery, including a rear support plate 1. Both ends of a side of the rear support plate 1 are respectively welded to a guide rod 2. A retention groove is welded to a surface of the guide rod 3. An outer surface of the retention groove 3 is welded on a surface of the plurality of heat exchange plates 4 by a groove. A clamping plate 5 is provided at a front end surface of the heat exchange plates 4 at a front end. A side surface of the clamping plate 5 is connected to a side surface of the rear support plate 1 through clamping studs 7 to achieve a penetration mounting. Two cold-side ports 6 and two hot-side ports 15 are respectively arranged on a side of the clamping plate 5. A rubber sealing lining is respectively arranged on an inner circumference of the two cold-side ports 6 and the two hot-side ports 15. At least seven bolts are screwedly provided around a periphery of the two clod-side ports 6 and the two hot-side ports 15. A surface edge of each of heat exchange plates 4 is recessed with a side groove 8. A plurality of openings 10 are provided on a surface of each of plurality of heat exchange plates 4 in correspondence to the cold-side ports 6 and the hot-side ports 15, and the number of the plurality of openings 10 is the same with the total number of the cold-side ports and the hot-side ports. A ring gasket is fitted on a periphery of the plurality of opening 10. A gasket groove 9 is provided at a surface of each of the plurality of heat exchange plates 4 at the periphery of the plurality of openings 10. A mounting groove 11 is provided on one side of the gasket groove 9 connecting to the plurality of openings 10. An exchange surface 12 is pressed on a surface of the plurality of heat exchange plates 4 on one side of the mounting groove 11. A diversion arc 13 is provided on the surface of the plurality of heat exchange plates 4 at one side of the exchange surface 12. The surfaces of the two cold-side ports 6 and the two hot-side ports 15 respectively have a protruding structure. A negative ion generator 14 is respectively embedded on protruding surface of the two cold-side ports 6 and the two hot-side port 15.

The two hot-side ports 15 are symmetrically distributed on the same side, and a radius of each of the hot-side ports 15 is consistent with that of each of the two cold-side ports 6. The negative ion generator 14 is a direct-current micro negative ion generator, and electrically controlled by the power battery. The negative ion generator 14 is powered by a vehicle power battery to generate negative ions. The plurality of heat exchange plates include A type heat exchange plates and B type heat exchange plates. The A type heat exchange plates and the B type heat exchange plates are alternately distributed. The number of the plurality of heat exchange plates is determined according to actual requirements. The plurality of heat exchange plates are fixed by welding. The exchange surface 12 of each of the A type heat exchange plates and the exchange surface 12 of each of the B type heat exchange plates are in mirrored distribution, and the diversion arc 13 of each of the A type heat exchange plates and the diversion arc 13 of each of the B type heat exchange plates are in a mirrored distribution.

In the embodiment, provided is a device for assembling and processing a plate heat exchanger of a power battery, including a cleaning box 16 and a base platform 17, which is welded to a bottom of the cleaning box 16. A water outlet pipe 18 is welded symmetrically through an inside of the base platform 17 obliquely. A power box 19 is provided at a middle of the inside of the base platform 17. A motor 20 is screwedly provided inside the power box 19. A top end of a rotating shaft of the motor 20 is penetratingly welded to a bottom end of a rotating plate 21, and a welding position between the rotating shaft and the rotating plate is sealed. An edge of an upper surface of the rotating plate 21 is welded to a bottom end of a connecting column 22. A top end of the connecting column 22 is penetratingly welded to a lower surface of an upper plate 23. An upper surface of the cleaning box 16 above the upper plate 23 is provided with a collection port 24, and the collection port 24 penetrates the upper surface of the cleaning box 16. A water spray pipe 26 is arranged at a bottom end of the collection port 24 and penetrates the upper plate 23. An inner circumference of the rotating plate 21 is equipped with a gusset area 25. A buckle protrusion 252 is provided on the upper surface of the gusset area 25. A welding plane 251 is provided on an upper surface of the gusset area 25 for fixing the connecting column 22. A lower surface of the upper plate 23 is provided with a corresponding plate 232. An upper surface of the upper plate 23 is provided with a water leakage hole 233. A corresponding buckle block 232 is provided on the lower surface of the corresponding plate 231. A water diversion head 241 is arranged at an inner circumference of the collection port 24. A bottom end of the water diversion head 241 is arranged at a top of a water distribution pipe 242.

The cleaning box 16 has a barrel-shaped structure made of stainless steel, and a surface of the cleaning box 16 is provided with an arc-shaped acrylic sealed door with a handle structure through a hinge structure. A sealing rubber is pasted at a mounting position of a door seam of the cleaning box 16. The base platform 17 has a cylindrical structure made of round stainless steel, and a radius of the base platform 17 is equal to a radius of the cleaning box 16. The inside of the base platform 17 is an open structure except that an upper end of the power box 19 has a closed structure. A circular threaded through hole is provided at an outer side wall of the base platform 17. The water outlet pipe 18 is a seamless steel pipe, and a top end of the water outlet pipe 18 is welded to an outer surface of a top end of the power box 19. A bottom end of the water outlet pipe 18 is welded to an opening on the outer side wall of the base platform 17. An outlet of the base platform 17 is threadedly connected to a plastic water stop valve to control discharge of the water inside the cleaning box 16, so as to ensure the visibility of the work process, and improve the overall use experience and work efficiency of the device.

The power box 19 has a rectangular structure made of stainless steel, an inner wall of the power box 19 is bonded with an insulating rubber. A circular threading hole sealed with a rubber sealing ring is provided on a rear side wall of the power box 19. An opening-closing door is arranged on a front surface of the power box 19 through a hinge for maintenance. The motor 20 is a YE3 type motor, and the motor 20 is connected to a three-wire plug through a wire to connect to an external control power for power supply. The top end of the rotating shaft of the motor 20 penetrates an upper surface of the power box 19 to achieve transmission. The rotating plate 21 is made of round plastic. A surface of the rotating plate 21 is provided with a circular threaded hole, and a slope structure is provided at 0.3-0.5 cm within an edge of the rotating plate 21. The rotating plate 21 and the upper plate 23 have the same circular structure and are symmetrically distributed. Therefore, the transmission performance of the device is improved, and an overall stability and structural connectivity of the device is optimized.

The gusset area 25 has a polygonal structure made of stainless steel, and the number of sides of the gusset area is equal to or more than twenty. A "U"-shaped plastic buckle protrusion 252 is adhered to a surface of each side of the gusset area, and a rectangular groove is provided on a surface of the buckle protrusion and penetrates through the buckle protrusion 252. A soft silica gel with a thickness of 2-3 mm is adhered to an inner surface of the rectangular groove, and the number of buckle protrusions 252 is two less than the number of sides of the gusset area, and each surface of the two sides of the gusset area without the buckle protrusion is the welding plane. The buckle protrusion 252 is adhered at an angle of 20 degrees. The corresponding plate adopts the same structure as the gusset area, and the number of sides of the corresponding plate 231 is consistent with the number of sides of the gusset area. A center of the corresponding plate 231 and a center of the gusset area 25 are on the same horizontal line. The corresponding buckle block 232 is arranged in the same structure as the buckle protrusion 252, and a linear length of the corresponding buckle block 232 is greater than a linear length of the buckle protrusion 252. The corresponding buckle block 232 is distributed obliquely at an angle of 20 degrees, and the corresponding buckle block 232 and the buckle protrusion 252 are inclined in different directions. The corresponding buckle block 232 and the buckle protrusion 252 are distributed staggered in a vertical direction, thereby improving the structural correspondence and the overall stability of the device, and bringing a stable buckle experience for users.

The collection port 24 has a tubular structure, and the water diversion head 241 has a tubular structure made of polypropylene, which is threadedly fixed on an upper end surface of the cleaning box 16. The water diversion head 241 is configured to connect to an external water pipe for water supply. The water distribution pipe 242 has a tubular structure at the upper end and a branch structure at the bottom end, and is made of polypropylene. The water distribution pipe 242 has at least ten branch pipes, and a center of the bottom end of the water distribution pipe 242 is protrudedly provided with a central branch pipe for connecting the water spray pipe 26. The water leakage hole 233 is provided on a surface of the upper plate 23, and the water leakage hole 233 is configured to transmit a water flow of branch pipes of the water distribution pipe 242 for flushing, so as to optimize moisture distribution, and improve moisture coverage, thereby bring a stable moisture transmission experience for users.

The water spray pipe 26 has a tubular structure made of stainless steel, and a plurality of openings are unevenly provided at a surface of the water spray pipe 26. A radius of the plurality of openings is not greater than 0.5 mm. A distance between a bottom end of the water spray pipe 26 and an upper surface of the rotating plate 21 is 1-1.5 cm. The connecting column 22 is made of stainless steel, and a linear radius of the connecting column 22 is not greater than 1 cm. The connecting column 22 is vertically welded to the welding plane. Therefore, the overall water flow transmission performance of the device is improved, bringing a multi-angle water flow cleaning structure for users.

The various components adopted in this application document are all standard parts. The specific connection methods of each part adopt mature conventional methods such as bolts and welding in the prior art, and the machinery, parts and electrical equipment adopt the conventional models in the prior art. The circuit connection adopts the conventional connection method in the prior art, which will not be repeated herein.

In the plate heat exchanger of the power battery involved in the present disclosure, the hot outlet and the hot inlet are arranged on the same side, and the cold outlet and the cold inlet are arranged on the same side, so that those skilled in the art of the application can arrange the outlets according to professional technical knowledge. The heat exchange plates include A type heat exchange plate and B heat exchange plate. In a mounting process, the glue is provided on an inside of the gasket groove 9 to achieve adhesion, and the A type heat exchange plates and B type heat exchange plates are alternately distributed, and the adhesive linings are arranged in a sealed manner, thereby completing a mounting of the heat exchange plates. Due to the different directions of the guide grooves on the A type heat exchange plates and B type heat exchange plates, the hot air and the cold air flow alternately to achieve heat exchange. Moreover, the power battery provides power for negative ion purifier, and the purifier purifies the gas or liquid at the inlet and the outlet, to weaken the fouling phenomenon on the surface of the plurality of heat exchange plates 4.

A working principle of the device for assembling and processing the plate heat exchanger of the power battery provided in the present disclosure is as follows. The device is connected to an external control power supply through a three jaw plug. The water outlet pipe is connected to the water diversion head 241, and the upper and lower ends of the plurality of heat exchange plates 4 are respectively buckled on the surface of the corresponding buckle block 232 of the corresponding plate 231 and the surface of the buckle protrusion 252 of the buckle area 25. Since the buckle projection 252 and the corresponding buckle block 232 are arranged obliquely, the plurality of heat exchange plates 4 after buckling will be fixed obliquely. The external control power is controlled to power on, and the water distribution pipe is controlled by a valve to realize water distribution. The water is transmitted to the water distribution pipe 242 through the water diversion head 241, where a part of the water is transmitted to the surface of the upper plate 23 through the water distribution pipe 242; a part of the water is transmitted through the leak hole 233; a part of the water falls into the cleaning box 16; and a part of the water is transmitted to the water spray pipe 26 through the center of the branch pipe. A bottom end of the water spray pipe 26 is sealed by welding. Therefore, when the water flow passes through the surface of the water spray pipe 26, the water flow will be sprayed through the plurality of openings on the surface of the water spray pipe 26 to wash the plurality of heat exchange plates 4. The user can determines the cleaning state through an observation window, and the water valve connected to the water outlet pipe 8 is configured for draining water. The heat exchange plates 4 are manually removed to achieve dry workmanship, and then the heat exchange plates are mounted.

In a conclusion, in the device for assembling and processing the plate heat exchanger of the power battery, the corresponding plate 231, the gusset area 25, the water distribution pipe 242 and the water spray pipe 26 are provided to realize an end-to-end cleaning for the device, avoiding the disadvantages of strong manual cleaning, and long cleaning period. A cleaning structure is arranged to provide a full range and multi-angle cleaning, improving the cleaning efficiency of the device.

Although the embodiments of the present disclosure have been described in detail above, it should be noted that various changes, modifications and replacements can still be made by those of ordinary skill in the art to these embodiments without departing from the principle and spirit of the present disclosure. These changes, modifications and replacements should still fall within the scope of the disclosure defined by the appended claims.

What is claimed is:

1. A device for assembling and processing a plate heat exchanger of a power battery, comprising:
   a cleaning box; and
   a base platform;
   wherein the base platform is welded to a bottom of the cleaning box; a water outlet pipe is welded symmetrically through an inside of the base platform obliquely; a power box is provided at a middle of the inside of the base platform; a motor is screwedly provided inside the power box; a top end of a rotating shaft of the motor is penetratingly welded to a bottom end of a rotating plate, and a welding position between the rotating shaft and the rotating plate is sealed; an edge of an upper surface of the rotating plate is welded to a bottom end of a connecting column; a top end of the connecting column is penetratingly welded to a lower surface of an upper plate; an upper surface of the cleaning box above the upper plate is provided with a collection port, and the collection port penetrates the upper surface of the cleaning box; a water spray pipe is arranged at a bottom end of the collection port and penetrates the upper plate; an inner circumference of the rotating plate is provided with a gusset area; a buckle protrusion is provided on an upper surface of the gusset area; a welding plane is provided on the upper surface of the gusset area for fixing the connecting column; a lower surface of the upper plate is provided with a corresponding plate; a water leakage hole is penetratingly arranged at an upper surface of the upper plate; a corresponding buckle block is protrudingly provided on the lower surface of the corresponding plate; a water diversion head is arranged at an inner circumference of the collection port; and a bottom end of the water diversion head is arranged at a top of a water distribution pipe.

2. The device of claim 1, wherein the plate heat exchanger of the power battery comprises a rear support plate; both ends of a side of the rear support plate is respectively welded to a guide rod; a retention groove is welded to a surface of the guide rod; an outer surface of the retention groove is welded on a surface of a plurality of heat exchange plates by a groove; a clamping plate is provided at a front end surface of the heat exchange plates at a front end; a side surface of the clamping plate is connected to a side surface of the rear support plate through a clamping stud to achieve a penetration mounting; two cold-side ports and two hot-side ports are respectively arranged on a side of the clamping plate; a rubber sealing lining is respectively arranged on an inner circumference of the two cold-side ports and the two hot-side ports; at least seven bolts are screwedly provided around a periphery of the two clod-side ports and the two hot-side ports; a surface edge of each of the plurality of heat exchange plates is recessed with a side groove; a plurality of openings are provided on a surface of each of plurality of heat exchange plates in correspondence to the cold-side ports and the hot-side ports; the number of the plurality of openings is the same with the total number of the cold-side ports and the hot-side ports; a ring gasket is fitted on a periphery of each of the plurality of openings; a gasket groove is provided at a surface of each of the plurality of heat exchange plates at the periphery of each of the plurality of openings; a mounting groove is provided on one side of the gasket groove connecting to the plurality of openings; an exchange surface is pressed on the surface of the plurality of heat exchange plates on one side of the mounting groove; a diversion arc is provided on the surface of the plurality of heat exchange plates at one side of the exchange surface; the two cold-side ports and the two hot-side ports respectively have a protruding surface; and a negative ion generator is respectively embedded on the protruding surface of the two cold-side ports and the two hot-side ports;
   the two hot-side ports are symmetrically distributed on the same side; a radius of each of the two hot-side ports is consistent with a radius of each of the two cold-side ports; the negative ion generator is a direct-current micro negative ion generator, and electrically controlled by the power battery; the negative ion generator is powered by the power battery to generate negative ions; the plurality of heat exchange plates comprise A type heat exchange plates and B type heat exchange plates; the A type heat exchange plates and the B type heat exchange plates are alternately distributed; the number of the plurality of heat exchange plates is determined according to actual requirements; the plurality of heat exchange plates are fixed by welding; the exchange surface of each of the A type heat exchange plates and the exchange surface of each of the B type heat exchange plates are in mirrored distribution; and the diversion arc of each of the A type heat exchange plates and the diversion arc of each of the B type heat exchange plates are in a mirrored distribution.

3. The device of claim 1, wherein the cleaning box has a barrel-shaped structure made of stainless steel; a surface of the cleaning box is provided with an arc-shaped acrylic sealed door with a handle structure through a hinge structure; a sealing rubber is pasted at a mounting position of a door seam of the cleaning box; the base platform has a cylindrical structure made of stainless steel; a radius of the base platform is equal to a radius of the cleaning box; the inside of the base platform is an open structure except that an upper end of the power box has a closed structure; a circular threaded through hole is provided at an outer side wall of the base platform; the water outlet pipe is a seamless steel pipe, and a top end of the water outlet pipe is welded to an outer surface of a top end of the power box; a bottom end of the water outlet pipe is welded to an opening on the outer side wall of the base platform; and an outlet of the base platform is threadedly connected to a plastic water stop valve to control discharge of water inside the cleaning box.

4. The device of claim 1, wherein the power box has a rectangular structure made of stainless steel; an inner wall of the power box is bonded with an insulating rubber; a circular threading hole sealed with a rubber sealing ring is provided on a rear side wall of the power box; an opening-closing door is arranged on a front surface of the power box through a hinge for maintenance; the motor is a YE3 type motor, and the motor is connected to a three-wire plug through a wire to connect to an external control power for power supply; the top end of the rotating shaft of the motor penetrates an upper surface of the power box to achieve transmission; the rotating plate is made of round plastic; a surface of the rotating plate is provided with a circular threaded hole; a slope structure is provided at 0.3-0.5 cm within an edge of the rotating plate; and the rotating plate and the upper plate have the same circular structure and are symmetrically distributed.

5. The device of claim 1, wherein the gusset area has a polygonal structure made of stainless steel; the number of sides of the gusset area is equal to or more than twenty; a "U"-shaped plastic buckle protrusion is adhered to a surface of each side of the gusset area; a rectangular groove is provided on a surface of the buckle protrusion and penetrates through the buckle protrusion; a soft silica gel with a thickness of 2-3 mm is adhered to an inner surface of the rectangular groove; the number of buckle protrusions is two less than the number of sides of the gusset area, and each surface of the two sides of the gusset area without the buckle protrusion is the welding plane; the buckle protrusion is adhered at an angle of 20 degrees; the corresponding plate adopts the same structure as the gusset area; the number of sides of the corresponding plate is consistent with the number of sides of the gusset area; a center of the corresponding plate and a center of the gusset area are on the same horizontal line; the corresponding buckle block is arranged in the same structure as the buckle protrusion; a linear length of the corresponding buckle block is greater than a linear length of the buckle protrusion; the corresponding buckle block is distributed obliquely at an angle of 20 degrees; the corresponding buckle block and the buckle protrusion are inclined in different directions; and the corresponding buckle block and the buckle protrusion are staggered in a vertical direction.

6. The device of claim 1, wherein the collection port has a tubular structure; the water diversion head has a tubular structure made of polypropylene; the water diversion head is threadedly fixed on an upper end surface of the cleaning box; the water diversion head is configured to connect to an external water pipe for water supply; the water distribution pipe has a tubular structure at the upper end and a branch structure at the bottom end, and is made of polypropylene; the water distribution pipe has at least ten branch pipes; a center of the bottom end of the water distribution pipe is protrudedly provided with a central branch pipe for connecting the water spray pipe; the water leakage hole is provided on a surface of the upper plate; and the water leakage hole is configured to transmit a water flow of branch pipes of the water distribution pipe for flushing.

7. The device of claim 1, wherein the water spray pipe has a tubular structure made of stainless steel; a plurality of openings are unevenly provided at a surface of the water spray pipe; a radius of the plurality of openings is not greater than 0.5 mm; a distance between a bottom end of the water spray pipe and an upper surface of the rotating plate is 1-1.5 cm; the connecting column is made of stainless steel; a linear radius of the connecting column is not greater than 1 cm; and the connecting column is vertically welded to the welding plane.

* * * * *